June 20, 1944.  H. E. MEYER  2,352,111
BATTERY HANGER
Filed Aug. 14, 1941
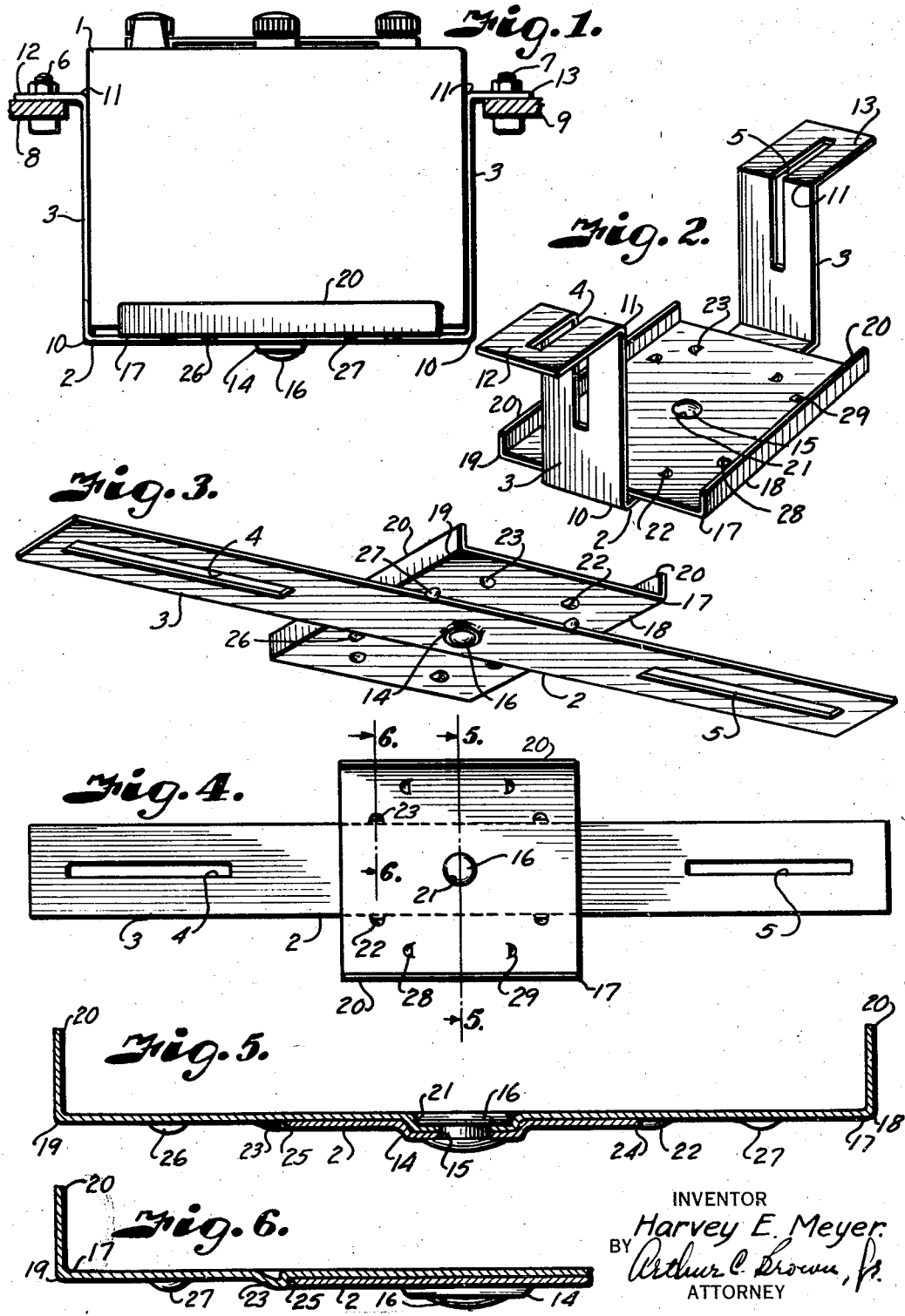
INVENTOR
Harvey E. Meyer.
BY Arthur C. Brown,
ATTORNEY Patented June 20, 1944

2,352,111

UNITED STATES PATENT OFFICE 2,352,111

BATTERY HANGER

Harvey E. Meyer, Kansas City, Mo., assignor to Whitaker Battery Supply Company, North Kansas City, Mo., a corporation of Missouri Application August 14, 1941, Serial No. 406,817

7 Claims. (Cl. 180—68.5)

This invention relates to a battery hanger, and more particularly to a hanger that effectively fits and binds storage batteries, such as are used in automobiles, motor boats, and the like, of any practical size, in operative position, the principal object of the invention being to provide a convenient, adjustable, relatively economical and efficient battery hanger.

Other objects of the present invention are to provide a hanger that fits any size battery; to provide a hanger, the use of which facilitates the installation and removal of a battery in such a manner that installation or removal may be effected in the least possible time and with the least possible inconvenience; to provide a hanger which serves to hold a storage battery in operative position irrespective of the size of the battery; to provide a hanger which retains the storage battery in position and prevents movements of the battery ordinarily due to movement of the vehicle; to provide a hanger which retains the storage battery in either transverse or longitudinal relation to a supporting frame; to provide a substantially universal battery hanger; and to provide improved elements and arrangements thereof in a battery hanger of the character and for the purposes set forth.

In accomplishing these and other objects of the present invention, I have provided improved details of structure, the preferred form of which is illustrated in the accompanying drawing, wherein:

Fig. 1 is a side elevational view of a battery supported by a hanger embodying the features of the present invention.

Fig. 2 is a detail perspective view of my improved hanger showing the hanger in longitudinal relation to a hanger supporting strap.

Fig. 3 is a bottom perspective view of the hanger with the side members shown unformed and showing the hanger in transverse relation to the supporting strap therefor.

Fig. 4 is a plan view of the hanger with the straps unformed and with the hanger in longitudinal relation to the supporting strap.

Fig. 5 is a detail, vertical, transverse cross-sectional view through the hanger, substantially on the line 5—5, Fig. 4.

Fig. 6 is a vertical, transverse, cross-sectional view through the hanger substantially on the line 6—6, Fig. 4.

Referring more in detail to the drawing:

1 designates a conventional storage battery, which may be of any suitable design, and which is preferably rectangular in shape.

My improved battery hanger is primarily designed to hold any size storage battery in transverse or longitudinal relation to a supporting frame within a vehicle or the like, such as an automobile.

The hanger preferably consists of a band of strap iron 2, or of any suitable material that may be bent to conform to the contour of the storage battery as indicated by the upstanding strap arms or sections 3. Slots 4 and 5 are provided in the strap to allow passage of bolts 6 and 7 or the like, which may be mounted on sills or supporting members, as indicated at 8 and 9, Fig. 1, of a vehicle or the like, on which the battery is mounted. The upstanding sections 3 of the strap are bent upwardly preferably at substantially a ninety-degree angle as indicated at 10, then preferably laterally and outwardly as indicated at 11 in such a manner that the lateral slotted sections 12 and 13 may be bolted or otherwise secured to the sills 8 and 9 for holding the battery securely in place as shown in Fig. 1.

Located preferably substantially centrally of the strap 2 is a depressed seat 14, provided with an opening 15 in the center thereof adapted to receive a bolt, rivet or the like 16.

Mounted intermediately of the ends of the strap 2 is a primary battery support 17 preferably consisting of a piece of sheet metal, also of rectangular shape for supporting the storage battery 1. The support preferably has a pair of opposite sides bent upwardly, as indicated at 18 and 19 to form a pair of opposite longitudinal flanges 20 for preventing sidewise movement of the storage battery when mounted in a vehicle for use.

The battery support 17 is also provided with a depressed portion having a central recess 21, Fig. 5, said depressed portion being adapted to pivotally nest in the seat 14 of the strap 2, and is pivotally supported on the strap by the bolt or rivet 16 for holding the strap and support in rotative relation to each other.

The battery support 17 is also provided with corresponding pairs of depressed stops 22 and 23 or the like, adapted to engage the sides of the strap 2, as shown in Fig. 5 at 24 and 25, and in such a manner that the longitudinal flanges 20 and 21 of the battery support are parallel to the side edges of the strap 2.

The support 17 is also provided with lugs 26 and 27 or the like, formed by depressions in the support as indicated at 28 and 29, Fig. 4.

The support as so arranged is pivotally mounted on the strap 2 by the bolt or rivet 16 and, when it is desired to support a battery transversely of the strap 2, the support 17 may be sprung outwardly relative to the strap and pivoted on the bolt or rivet 16 to a position wherein the lugs 26 and 27 engage the sides of the strap 2 and hold the longitudinal flange 20 of the member 17 in transverse relation to the edges of the strap 2.

The operation of a battery hanger constructed as described is as follows:

When the size of the battery to be supported by the present hanger is determined, the side flanges of the primary battery support 17 are turned upwardly to provide an appropriate space therebetween. The battery support 17 is then fastened to the strap 2 by the bolt or rivet 16, as shown in Fig. 4. The ends of the strap 2 are then bent upwardly, as shown in Fig. 2, forming the sections 3 in such a manner that said sections fit snugly against the sides of the battery to be supported. The outer ends of the strap 2 are bent laterally of the sections 3 at a distance preferably slightly below the top of the storage battery. The hanger may then be fastened to the sills or supporting members 8 and 9 of a vehicle by the bolts 6 and 7. The storage battery 1 may then be placed in the hanger, as shown in Fig. 1, the longitudinal flange 20 of the support and the sections 3 of the strap holding the battery securely in place.

The arrangement of the hanger, as shown in Fig. 3, is provided for use when the position of the battery in a vehicle requires that the battery be placed transversely of the strap 2; this for convenience and easy mounting of the battery in a certain position in the vehicle.

It is apparent, therefore, that my invention provides a battery hanger that is strong, rigid, durable and easily installed; that provides for easy placement and removal of a storage battery of any size in the hanger; and that provides a convenient, economical and efficient battery hanger that is admirably suited for carrying out the purposes for which it was designed.

What I claim and desire to secure by Letters Patent is:

1. A hanger for storage batteries including a strap formed from a blank of bendable sheet material, means for anchoring the strap to a vehicle, and means pivotally mounted on the strap for seating a storage battery, said pivotally mounted means being adjustable to longitudinal or transverse relation to said strap prior to bending said strap.

2. A hanger for storage batteries including a strap formed from a blank of sheet metal bent to form end walls and provided with slots for passage of bolts therethrough for anchoring the strap to a vehicle, and means pivotally mounted on the strap for retaining a storage battery in longitudinal or transverse alignment thereon.

3. A hanger for installing storage batteries in a vehicle including a bendable strap, means for anchoring the hanger to said vehicle, and means pivotally mounted on the strap for seating a storage battery in longitudinal or transverse relation to said strap.

4. A universal hanger for storage batteries comprising a blank of bendable sheet material having portions bent to form end battery supporting walls, means for anchoring certain of said bent ends to a vehicle, means pivotally mounted on said blank for primarily seating a storage battery, and interengageable means on said pivotally mounted means and blank for holding said storage battery in transverse or longitudinal relation to said blank.

5. In a universal battery hanger of the character described, a primary supporting member for seating a battery, a hanger member adapted for support on a vehicle, means pivotally mounting the supporting member relative to the hanger member and means on one of said members interengageable with the other member for normally retaining the supporting member in selected longitudinal or transverse position relative to said hanger.

6. A hanger for storage batteries comprising a blank of bendable sheet material having portions bent to form end battery supporting walls, means for anchoring the bent ends to a vehicle, means pivotally mounted on said blank for primarily seating a storage battery, and lugs on said pivotally mounted means and blank for holding said storage battery in transverse or longitudinal relation to said blank.

7. A hanger for storage batteries including a strap formed from a blank of bendable sheet metal, having a depressed seat located substantially centrally thereof, said seat having an opening therein adapted to receive a bolt for mounting storage battery retaining means on said strap, and means pivotally mounted on the strap by said bolt for retaining a storage battery in longitudinal or transverse alignment thereon.

HARVEY E. MEYER.